(12) United States Patent
Nijim et al.

(10) Patent No.: US 9,084,030 B1
(45) Date of Patent: Jul. 14, 2015

(54) UNIFIED MANAGEMENT AND CONTROL OF USERS AND DEVICES OF A SERVICE NETWORK

(71) Applicant: Cox Communications, Inc., Atlanta, GA (US)

(72) Inventors: Yousef Wasef Nijim, Atlanta, GA (US); Jay Paul Langa, Cumming, GA (US); James Alan Strothmann, Johns Creek, GA (US); Muhammad Asif Raza, Norcross, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 13/760,212

(22) Filed: Feb. 6, 2013

(51) Int. Cl.
*H04N 5/445* (2011.01)
*H04N 7/16* (2011.01)
*H04N 21/83* (2011.01)
*H04N 21/475* (2011.01)
*H04N 21/4627* (2011.01)

(52) U.S. Cl.
CPC ........... *H04N 21/83* (2013.01); *H04N 21/4627* (2013.01); *H04N 21/4751* (2013.01)

(58) Field of Classification Search
CPC .............. H04N 21/441; H04N 21/462; H04N 21/4627; H04N 21/47; H04N 21/475; H04N 21/4751; H04N 21/4753
USPC ................................................. 725/25, 47, 37
See application file for complete search history.

(56) References Cited

U.S. PATENT DOCUMENTS

| | | | |
|---|---|---|---|
| 7,650,361 B1 * | 1/2010 | Wong et al. ............ 707/999.107 |
| 8,266,664 B2 * | 9/2012 | Qiu et al. ....................... 725/109 |
| 8,275,900 B2 * | 9/2012 | Meenan et al. ............... 709/232 |
| 2008/0059409 A1 * | 3/2008 | Montpetit .......................... 707/2 |
| 2008/0181377 A1 * | 7/2008 | Qiu et al. ..................... 379/93.24 |
| 2008/0281903 A1 * | 11/2008 | Kwiatkowski ............... 709/203 |
| 2009/0228962 A1 * | 9/2009 | Pathak ............................. 726/5 |
| 2010/0146607 A1 * | 6/2010 | Piepenbrink et al. ............ 726/7 |
| 2010/0223407 A1 * | 9/2010 | Dong et al. ..................... 710/70 |
| 2011/0035768 A1 * | 2/2011 | Ling et al. ...................... 725/28 |
| 2011/0106962 A1 * | 5/2011 | Cook et al. ..................... 709/231 |
| 2011/0107436 A1 * | 5/2011 | Cholas et al. .................. 726/29 |
| 2011/0209177 A1 * | 8/2011 | Sela et al. ....................... 725/39 |
| 2011/0283311 A1 * | 11/2011 | Luong ............................ 725/28 |
| 2012/0042359 A1 * | 2/2012 | Kuroda ............................. 726/3 |
| 2012/0079524 A1 * | 3/2012 | Kalidindi et al. .............. 725/28 |
| 2012/0210378 A1 * | 8/2012 | McCoy et al. ................ 725/109 |
| 2012/0227094 A1 * | 9/2012 | Begen et al. .................... 726/4 |
| 2012/0331536 A1 * | 12/2012 | Chabbewal et al. ............. 726/7 |
| 2013/0088650 A1 * | 4/2013 | Rouady et al. ................ 348/734 |
| 2013/0175333 A1 * | 7/2013 | Gilbert et al. ................. 235/375 |

* cited by examiner

*Primary Examiner* — James R Sheleheda
(74) *Attorney, Agent, or Firm* — Merchant & Gould

(57) ABSTRACT

A unified control (UC) interface is configured for use with a portable computing device in part to manage and control access and personalization of a service network including managing automatic user and device access to subscribed to services. The UC interface of an embodiment can be used to display an overview of a service network, including authorized users, authorized devices, and/or associated settings. The UC interface of one embodiment can be used with a portable computing device in part to enable an authorized user to manage access and/or programming personalization on a per user and/or device basis.

20 Claims, 10 Drawing Sheets

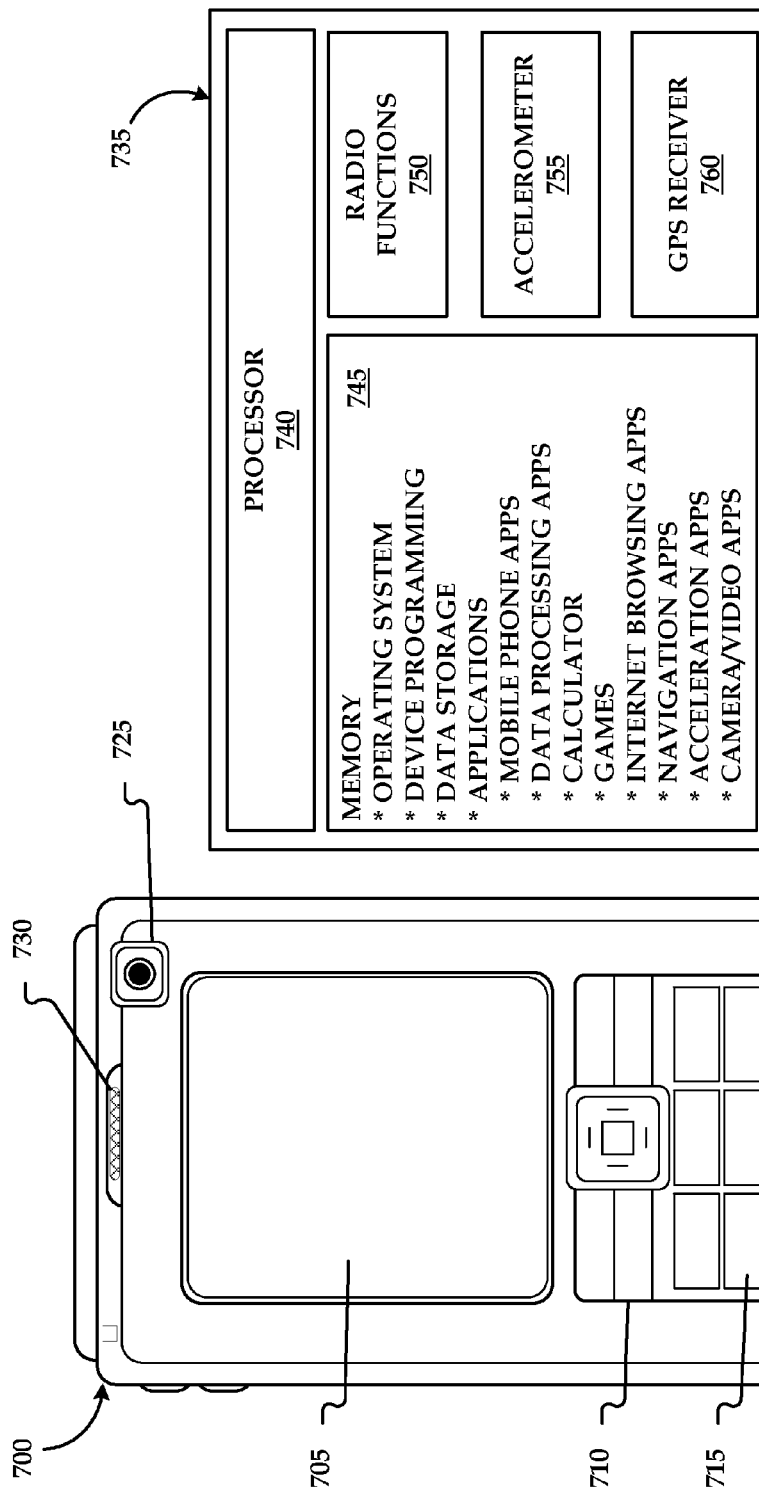

UNIFIED MANAGEMENT AND CONTROL OF USERS AND DEVICES OF A SERVICE NETWORK

BACKGROUND

Currently, cable and satellite television providers offer a variety of services for consumers to choose from for homes and businesses. Depending on the services offered, users may subscribe to receive cable services, satellite, cellular, and/or Internet services for example. A consumer may be required to use a set-top box (STB) or other decrypting device and/or a modem in order to receive a full array of subscribed to services. It is common practice for households and businesses to employ multiple STBs and/or smart television products as part of a cable or satellite programming television service. More recent service offerings allow for personal mobile device users to access some limited services. For example, some service providers offer the ability to watch cable television programming using a wireless network and a connected tablet or mobile phone.

With the current availability of affordable mobile devices, users now routinely employ multiple devices every day, such as tablet computers, laptops, and smart telephones as examples. Users have the ability to move from using one device to using some other device while using a home or business network. As part of protecting service integrity and preventing piracy, some type of authentication or validation is typically required when deploying a different device, such as requiring the user to select a service provider and/or input a valid username and password for example.

Requiring users to login before using each device can be frustrating, especially when attempting to use the limited controls typically available with a STB or television remote to login. Moreover, such limited controls may require an unreasonable amount of time to personalize a user viewing guide such as when adding favorite channels, recording programs, and setting parental controls. Users would prefer to use the rich controls and/or user interfaces of their mobile devices rather than the limited input controls currently available. Additionally, users would rather not have to re-enter authorization credentials each time they wish to access the services using different devices.

SUMMARY

To overcome the limitations described above, and to overcome other limitations that will become apparent upon reading and understanding the present specification.

Embodiments provide management and control features including the use of a unified control (UC) interface configured in part to operate with a portable computing device to manage aspects of a service network, including managing user and/or device access to subscribed to services. A method of an embodiment operates to use a portable computing device to execute programming code associated with the UC interface to display an overview of a service network, including authorized users, authorized devices, and/or associated settings of the service network. The UC interface of an embodiment is configured to enable an authorized user to manage access and personalization options on a per user or per device basis by way of the rich interactive features provided by a portable computing device. Computer storage or computer readable storage of an embodiment stores instructions or code configured to provide a UC application in part to manage aspects of a service network. Other embodiments are included.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout:

FIGS. 7a-7b illustrate an exemplary mobile computing environment in which which embodiments may be practiced.

DETAILED DESCRIPTION

Figure 1:
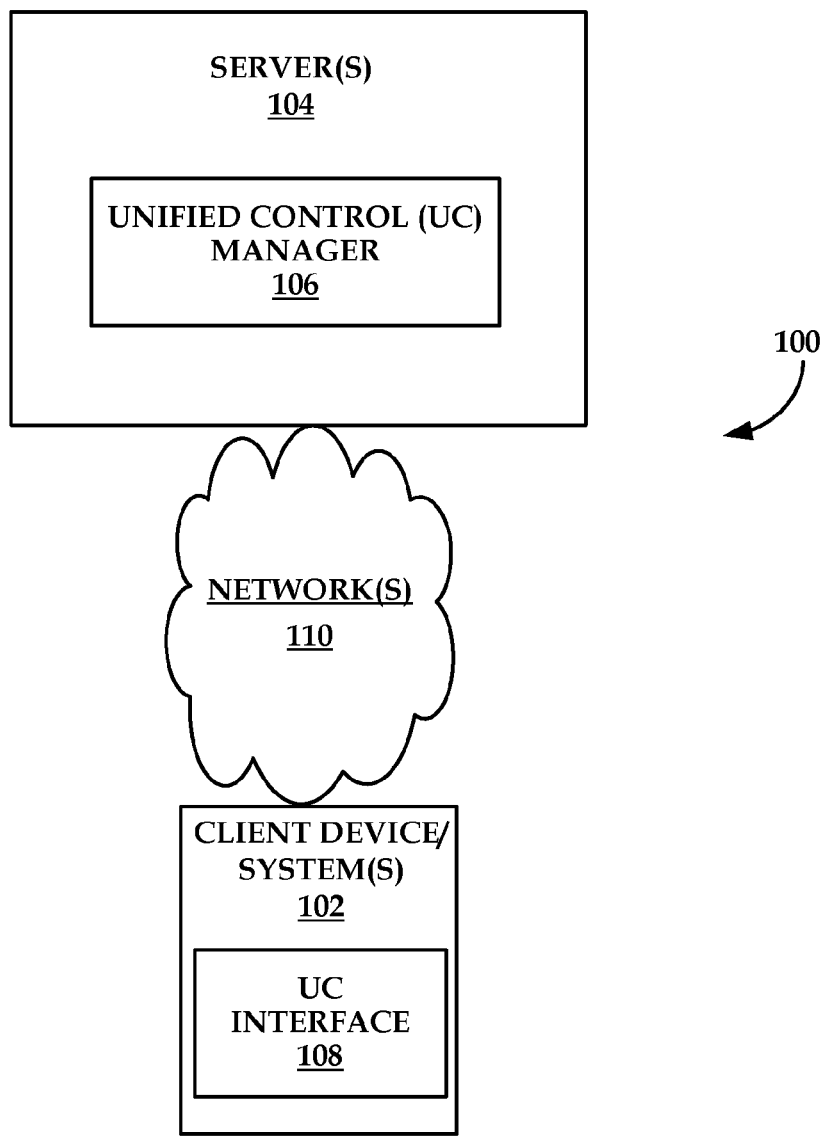
FIG. 1 is a simplified block diagram depicting aspects of an exemplary communication architecture according to an embodiment.

FIG. 1 is a simplified block diagram depicting aspects of an exemplary communication architecture 100 that includes a client computing device or system (client 102) in communication with a server computer or server 104, but is not so limited. The server 104 of an embodiment includes a plurality of coupled server computers and other networking infrastructure including a unified control (UC) manager or component 106. The UC manager 106 of an embodiment is configured in part to control the communication of login credentials or other authenticating information received from the client 102 as part of automatically controlling the communication of content from different information sources, such as legacy quadrature amplitude modulator (QAM) components and/or IP-based components.

The UC manager 106 can be used as part of enabling a user to use the client 102 (or other communicating device/system) to control automatic access and/or personalization of multiple registered or authorized computing devices/systems according to the corresponding users and/or services. For example, the UC manager 106 can be used as part of providing an overview of a service network for display on a portable computing device, along with providing management and control features over other computing devices/systems and/or users that are currently authorized to access subscribed to services.

As shown in FIG. 1, the client 102 includes a UC interface or component 108. The UC interface 108 of an embodiment is configured as a computer program product or application that can be downloaded and installed locally, or accessed as a web-based application, and includes programming code operable to provide unified management and control features associated with the service network. For example, a user can use the client 102 to visit an application store to download and launch the UC interface 108 to display a personalized overview (see FIGS. 2a-2d) of a home, business, or some other cable television service, satellite television service, or other communication environment based in part on the user login credentials, subscription type, mobile device type, STB type, etc.

Users can use features of the UC interface 108 with a variety of available portable computing devices to connect and login to subscribed to services while using rich interactive device features to manage and/or control aspects of a defined service network, such as home and business networks for example. According to an embodiment, users can use a portable computing device and UC interface 108 to manage automatic access and personalization of aspects of the service network including managing access and personalization of other authorized portable devices on a on a per user and/or per service basis.

Depending in part on the permissions of a logged in user, the UC interface 108 can be used to control personalization and other aspects of each service network, including personalizing different types of access points and/or level of service according to a particular accessing user and/or associated device types. As an example, a user can use a registered tablet computer or smart phone to launch the UC interface 108 to login via the UC manager 106 and display a personalized overview of settings associated with multiple STBs, smart televisions, and other user computing devices/systems (e.g., dad's tablet, mom's tablet, daughter's tablet, etc.). The UC interface 108 includes functionality to personalize favorite channels, full and partial guide views, video on demand views (e.g., only HD included with subscription), search features, DVR listing and scheduling options, home security, parental control features, etc. The client 102 and server 104 communicate over network(s) 110, such as a cable, satellite, cellular, and/or other type of communication network(s).

The UC interface 108 can be used to manage how and when, and to which users and/or devices, video and other services are to be delivered or accessed as part of managing a service network. For example, the UC interface 108 can be used to personalize programming while automatically logging in or logging out other authorized devices to use analog video, digital video, and other services. By using the UC interface 108 to manage automatic device login and logout operations, users are no longer required to login again and again when accessing services with other authorized devices.

A user can use the rich interactive input controls and display capabilities available with current portable devices to login using the UC interface 108 and manage automatic login and/or personalization views across all registered or authorized devices. The UC interface 108 provides a mechanism to enable a one time login enabling customers to automatically login to multiple devices without having to enter or re-enter previously entered correct login credentials for every device they own or have access to.

The UC interface 108 enables users to personalize and view services, including legacy QAM and IP-based services, as well as accessing different views according to personalized settings per authorized user per service per authorized device. As an example, the functionality of the UC interface 108 allows users to view a corresponding or substantially similar view on a portable computing device display or screen that would be displayed on a television display as controlled by a STB or other decoding apparatus. That is, the UC interface 108 can be used to access and control aspects of a STB without having to use the typically limited controls available through a STB or television remote control.

Correspondingly, the UC interface 108 and input controls (e.g., voice commands, touch commands, etc.) of the client 102 can be used to automatically submit login or user credentials without having to go through the generally frustrating experience of using limited remote control input capabilities offered by a STB, smart TV, or gaming console for example. Customers can use the UC interface 108 to bypass having to reenter login credentials each time they wish to access the services, such as when watching television online using multiple tablets and smartphones for example. Thus, users can use the UC interface 108 to more conveniently personalize and control access to services using smart phones, tablet devices, laptops, and/or other portable devices.

The UC interface 108 of an embodiment enables users to selectively login and/or logout multiple registered or authorized devices/systems as well as setting personalizations and other network aspects. As an example, a customer can use a tablet computer at home to selectively control automatic login and logoff of other authorized devices after initially logging in via the UC interface 108. As described below, the UC interface 108 can be configured to display a substantially similar view and controls as one would see while viewing a programming guide via a STB and a TV. For example, the UC interface 108 launched from a smart phone can be configured to display a substantially similar view as one would see while viewing a programming guide via a STB and a TV.

As described above, the UC interface 108 enables user access with another authorized device without having to re-enter login credentials once logged in. For example, the UC interface 108 and/or UC manager 106 can be used to transfer user login credentials or other authorization information to a STB, server, or other component as part of accessing content and/or services. Customers can either logout directly from a STB or by using a portable device running the UC interface 108. The UC interface 108 of an embodiment is configured with user interface features that allow the customer to choose devices that they want to login and/or logout at the same time, and choose one device or multiple devices to allow access at the same time.

The user can also use the UC interface 108 to control the requirement of a subsequent login action rather than automatically logging in authorized devices, while also selectively controlling automatic logout operations of one device or multiple devices. User credentials or other authentication information can be securely encrypted, stored, and safeguarded according to known techniques, such as by using an identity management system and/or secure cloud storage.

In an embodiment, the UC manager 106 can be used as part of accessing stored credentials from secure computer storage via any registered customer device running the UC interface 108. The UC manager 106 of one embodiment can be configured to manage devices that the customer is using to access services by tracking where each UC interface 108 is downloaded and/or used, while also allowing selections as to which devices to manage, along with allowable services, personalized settings and/or access points associated with each authorized user and/or device.

Customers are able to use the UC interface 108 to add user(s) and/or device(s) to a service network. As an example, an authorized primary account holder can use the UC interface 108 running on a tablet computer to control access and programming personalization by other newly added users and/or devices according to a login credential or other permission. The UC interface 108 can be used to manage access by a plurality of personal devices as well as other user devices/systems using an associated UC interface. The UC manager 106 of an embodiment can operate as centralized control point to grant access and direct transmission of login credentials to appropriate components of a service network.

The client-server communication architecture 100 can be configured using cable, satellite, wireless, and/or other components to control communication and access to legacy QAM and IP-based systems to deliver networked services including video and other services. For example, a cable or other service provider can offer the UC interface 108 for download and installation as part of providing personalized overview, view, and control options over aspects of the subscriber service network. For example, a parent can use the UC interface 108 to configure different access and/or personalization features to be displayed for a child's UC interface 108.

In order to gain access to the features of the UC interface 108, according to an embodiment, a user may have to download and install the UC interface 108 or another application program on each accessing device (according to the end-user login credentials). Additionally, a user may be required to initially enter an authorized username and/or password to gain access to personalized views. Service providers can utilize the functionality of the UC manager 106 in combination with features of the UC interface 108 to provide a unified management and control paradigm to provide rich interactive control of aspects of a service network. Correspondingly, once logged in, the UC interface 108 can be used to personalize aspects of a user's programming including a relevant programming lineup that may include analog video, digital video, and other services or content.

As an implementation example, the UC interface 108 can be configured as a downloadable application including executable program code to control how to display an overview of relevant components and/or users of a service network. Code, user preferences, and/or identifying information associated with the UC interface 108 and/or UC manager 106 can be stored in computer storage such as memory, hard disk storage, solid state components, or the like.

While a simplified block diagram is shown, it will be appreciated that complex communication networks used to deliver QAM and IP signals include sophisticated hardware and software components such as a plurality of networked servers, routers, switches, modems, and/or other components. Additionally, each portable computing device and associated UC interface may use programming data, metadata, availability information, including content delivered over RF and IP networks. Video programming from various content sources may be provided via a set-top box, DVR, or some other device/system. A recommendation engine can be included to generate recommendations regarding program selection for the UC interface 108 and a profile system or server can be used to provide user profile details based at least in part on the user and/or device/system information.

A user profile may reflect that a user prefers to launch associated UC interfaces from different computing devices, such as a primary tablet, secondary tablet, and a smart phone for example. As such, a profile server can provide profile information to enable the UC interface to use program guide data and other views relevant to a current user. A profile server may also include other information and/or preferences such as parental control settings, SAP controls, etc. that can be displayed using the UC interface 108. A device management server may be included to provide information regarding devices/systems associated with a service account.

The recommendation engine can communicate with a profile server to apply user profile parameters to generate recommendations. The recommendation engine may also identify the device/system currently in use and provide an appropriate display of available content. Rules may be used to control a number of user operations such as, for example, a priority for VOD over the Internet, a priority to linear programming on a user DVR, whether to include links and/or information about the availability of the favorite programs, etc. Other service and UC interface features may be based in part on particular customer subscriptions to certain tiers and networks.

FIGS. 2a-2d depict exemplary UC interface features according to embodiments. The exemplary UC interface 200 shown in FIG. 2a can be defined in part using programming code to provide an executable application that enables users of portable or mobile devices to effectively manage aspects of a service network, such as a home or business communication network that may include cable, satellite, cellular, and other networked services and associated infrastructure.

Figure 2A:
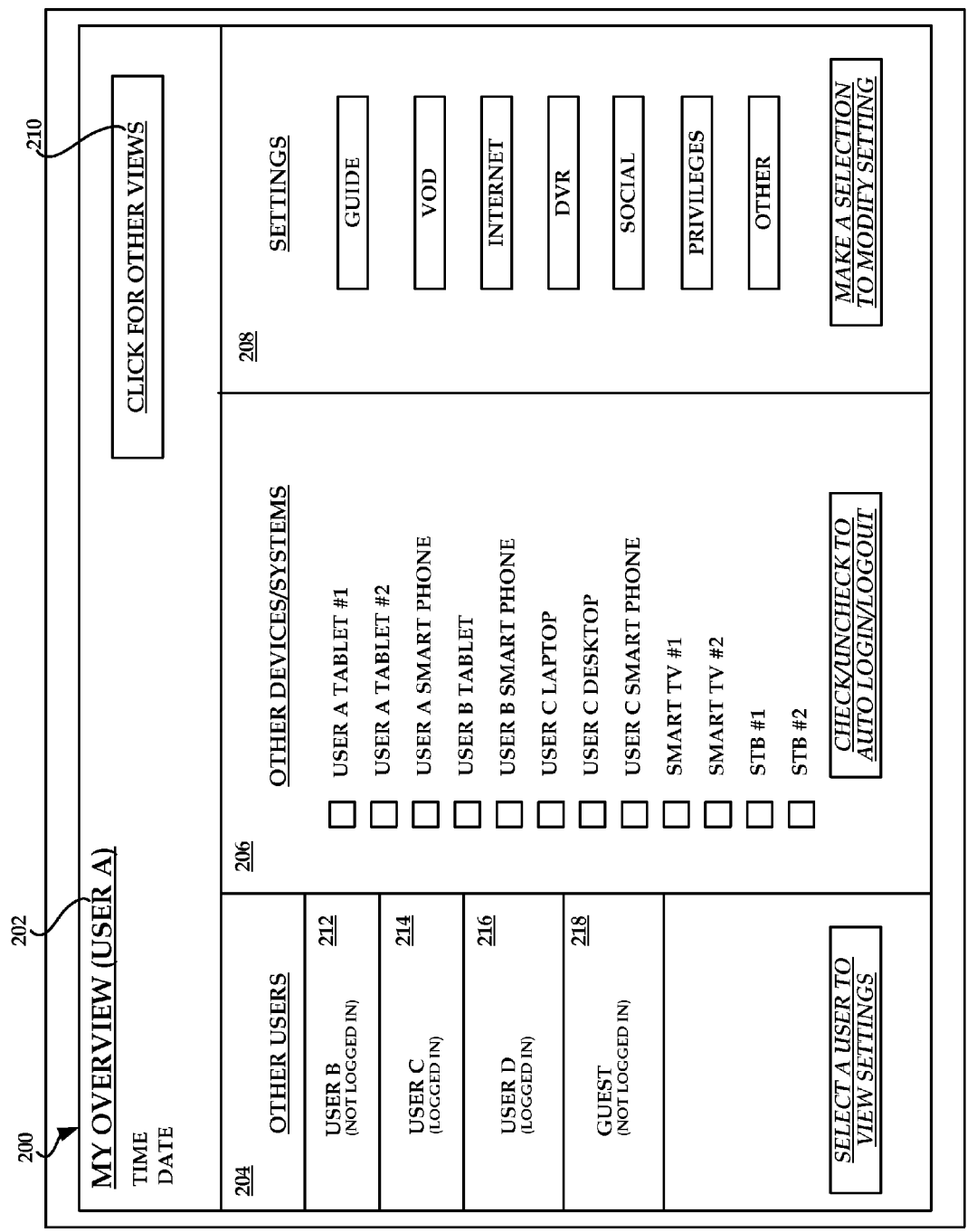
FIGS. 2a-2d depict exemplary UC interface features according to embodiments.

As shown in FIG. 2a, an exemplary screen or view, such as a home page or page provided after successful login for example, of the UC interface 200 provides a personalizable overview of aspects of a service network, such as a home or business cable programming and Internet network for example. According to the example interface architecture shown in FIG. 2a, User A 202 is provided with an initial overview displaying aspects of the service network, including section 204 that displays other users associated with the service network, section 206 that displays other devices associated with the service network, and section 208 that displays settings associated with the service network, including per user per service per device settings, as discussed below. The settings displayed in the section 208 can be updated as a user interacts with information being displayed in the UC interface 200.

The exemplary UC interface 200 also includes button or selection area 210 that can be actuated to display other views such as by using a drop-down or other menu of view options (e.g., STB 1, STB 2, User guide views, list view, grid view, genre view, HD view, favorites view, etc.) that may include per user personalized channel guide views, per user personalized recording settings, per user social network settings, and/or other service network views.

When installed on a tablet computer, smart phone, or other portable computing device, the UC interface 200 is configured to accept all of the rich input options afforded by the advanced computerized interfaces, including touch, audible, stylus, mouse, etc. type inputs. As described above, the UC interface 200 of an embodiment communicates with a server, such as an application server for example, or other component, as part of providing unified control and management features over a service network.

Assume for this example that a primary account holder, User A 202, has installed the UC interface 200 on one or more mobile or portable computing devices, such as a tablet, a laptop, and a smart phone for example, and used the tablet to log in to a corresponding application server or other component using correct login credentials or other authenticating information. In one embodiment, the UC interface 200 can be configured as a web-based application that may be accessed using a browser or other application. According to an embodiment, an application server or other component can be used to securely store and control access to login credentials including automatic forwarding of the credentials to QAM and/or IP service components.

For this example, the login credentials of User A 202 correspond with administrator or primary level privileges (shown as "(Admin)") that enable such a user to control and manage a larger variety of aspects of the service network, including capabilities that allow personalized STB setting, programming, and/or guide views, automatic login and logout of selected devices, view and modification capabilities for various user and/or device personalizations, view and modification capabilities for associated STB and smart television personalizations, etc. Other users may have more limited access and control options which can be defined by a primary or other user or by a subscription type or other rule.

As shown in FIG. 2a after logging in and according to the personalization and settings of User A 202, section 204 is configured to display information associated with a User B 212, a User C 214, a User C 216, and a guest user 218. In an embodiment, the UC interface 200 is configured to communicate with a dedicated server or other component that uses a unified management application in part to communicate information for populating aspects of the UC interface 200. For this example, the UC interface 200 shows that User B 212 is currently not logged in, User C 214 is currently logged in, User D 216 is currently logged in, and the guest user is not currently logged in. Section 204 of this example includes a notice that informs a user to select a user in order to view corresponding settings.

Section 206 of the view is configured to display other authorized devices of the service network. For this example, section 206 has been populated with devices that include a first tablet for User A 202, a second tablet for User A 202, a smart phone for User A 202, a tablet for User B 212, a smart phone for User B 212, a laptop for user C 214, a desktop for user C 214, a smart phone for user C 214, a first smart television, a second smart television, a first STB, and a second STB. Section 206 also includes a notice or other information that informs a user of the capability to automatically login and logout select devices/systems. The UC interface 200 also allows users to add and remove devices/system. Exemplary section 206 also includes a checkbox adjacent to each listed device which enables a user, such as User A 202, to selectively determine which devices to automatically login or logout.

Section 208 of the view is configured to display settings associated with the service network. Section 208 is automatically updated based in part on user inputs, such as when a user selects or highlights any user and/or listed device(s), to provide an overview and/or details of the access and personalization settings for each corresponding user or device. The UC interface 200 of one embodiment uses a double input operation (e.g., double click, double tap, etc.) to launch a view that a user would see if logged in. For example, User A 202 can double click on User B 212 to update the UC interface 200 and provide a personalized view that User B 212 would see if logged in, including favorite channels for each STB, recording settings, usage, social network feed(s)/log in status, recent programs viewed, etc.

Figure 2B:
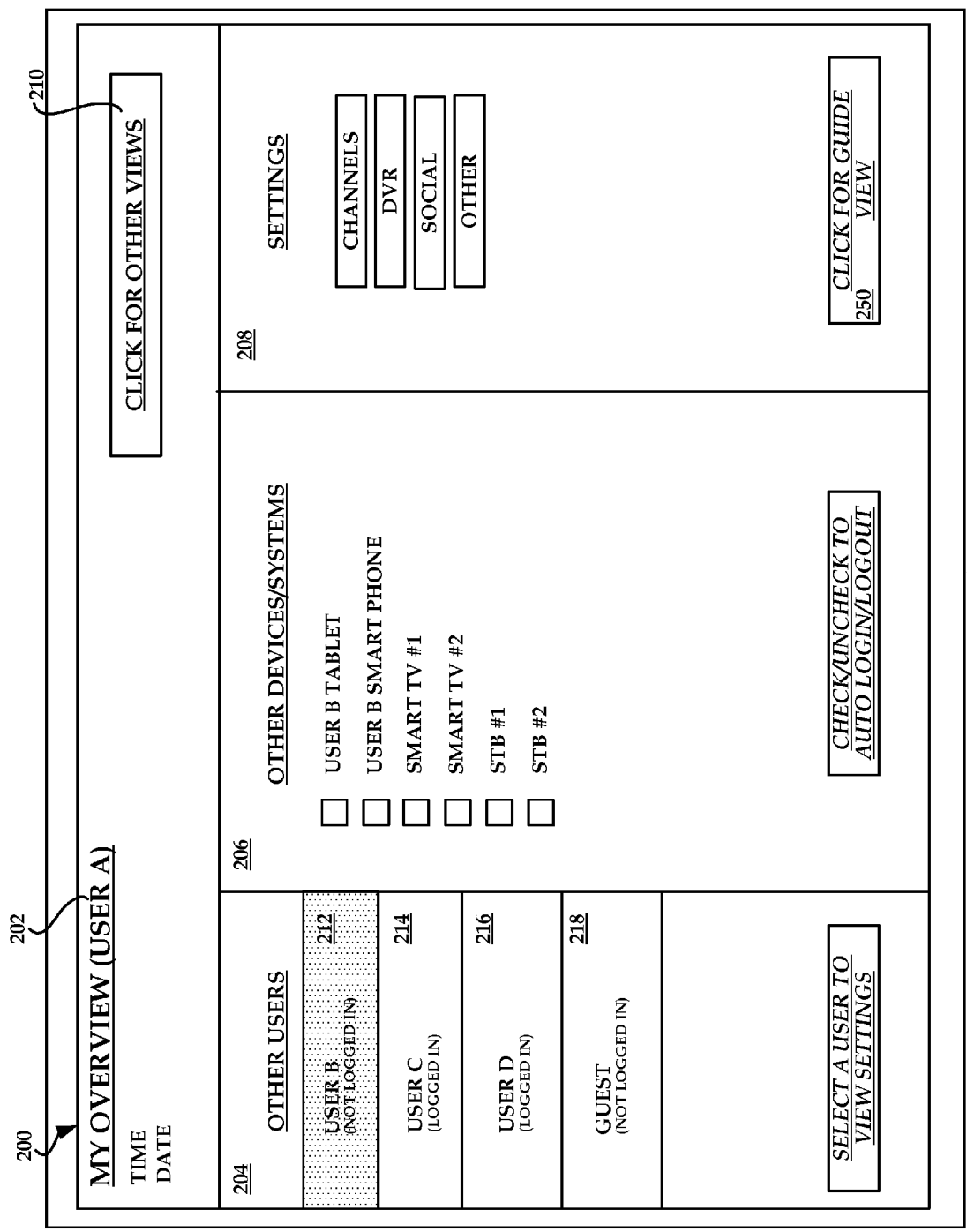

FIG. 2b depicts the UC interface 200 after User A 202 has highlighted User B 212 which has caused the UC interface 200 to update portions of the view. As part of the update of an embodiment, the UC interface 200 makes a call to an application server, STB, or other component as part of refreshing or updating the view based on a user selection. As shown in FIG. 2b, User B devices and associated checkmark boxes are displayed in the other device section 206 along with corresponding example settings after highlighting or otherwise selecting User B 212. Section 208 has been updated to include a new button or selection area 250.

It will be appreciated that, based in part on the privileges or other security settings, User B 212 may have more limited or greater control or personalization options as compared to other users, and check boxes or other areas may be greyed out or hidden if the user does not have the required privileges or access authorization. Settings associated with User B 212 are displayed in section 208 which may include logged in status per device or STB, favorite channels for each STB, recording settings, social network feed(s), recent programs viewed, etc. Selection area 250 can be actuated or used by User A 202 to display one or more personalized views, such as a tablet view, smart phone view, STB view, smart television view, etc. associated with User B 212. Similar view and interactive paradigms can be applied to other users, devices, and/or systems.

Figure 2C:
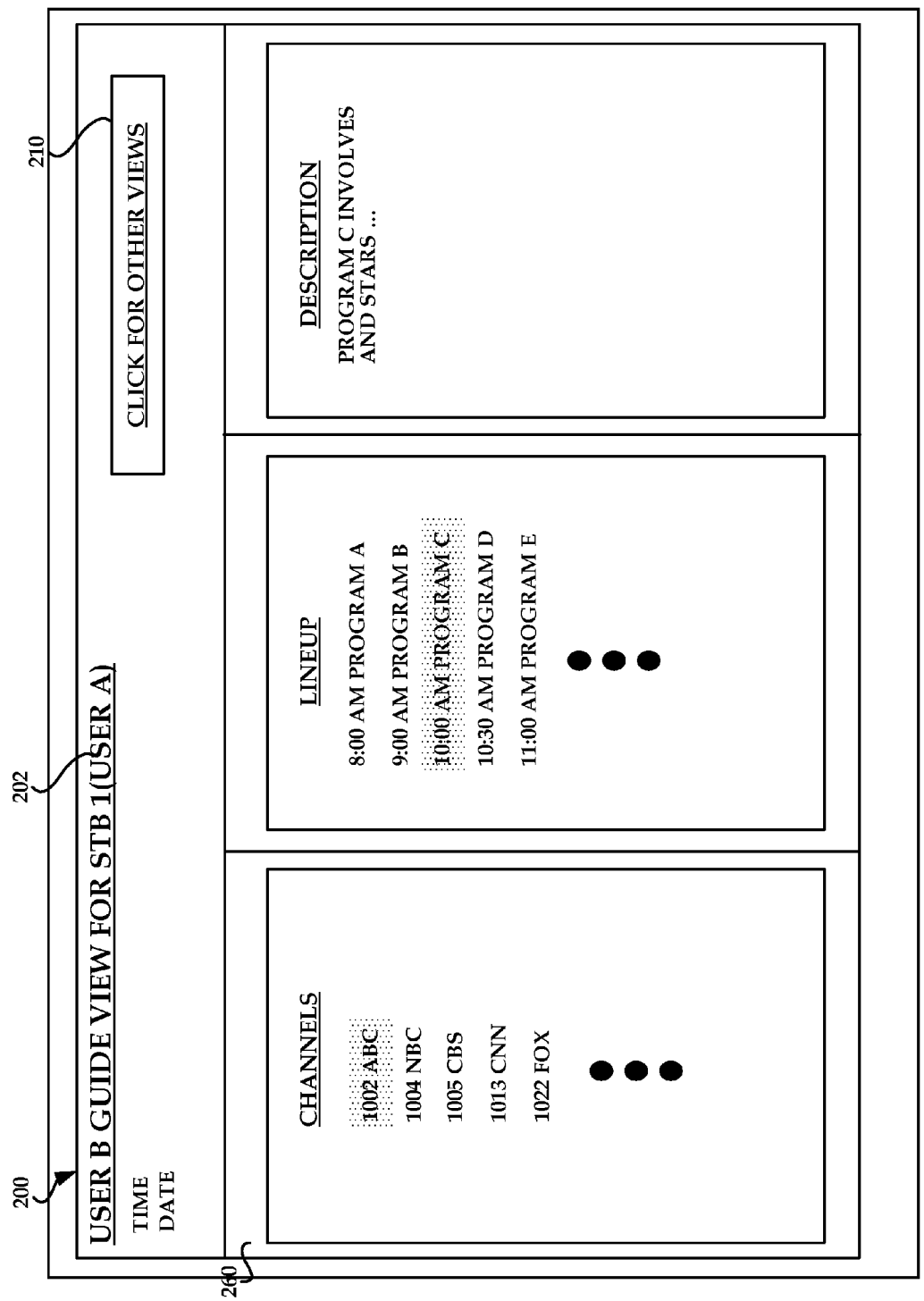

FIG. 2c depicts the UC interface 200 displaying a STB view 260 for User A 202 associated with the STB 1 guide view of User B on a tablet interface. In similar fashion, User A 202 can use the rich interface controls afforded by the tablet interface to efficiently navigate to other user and/or device views. It will be appreciated that the UC interface 200 can be configured with different display options, such a greater or fewer display sections, controls, and/or other graphical layouts or representations.

Figure 2D:
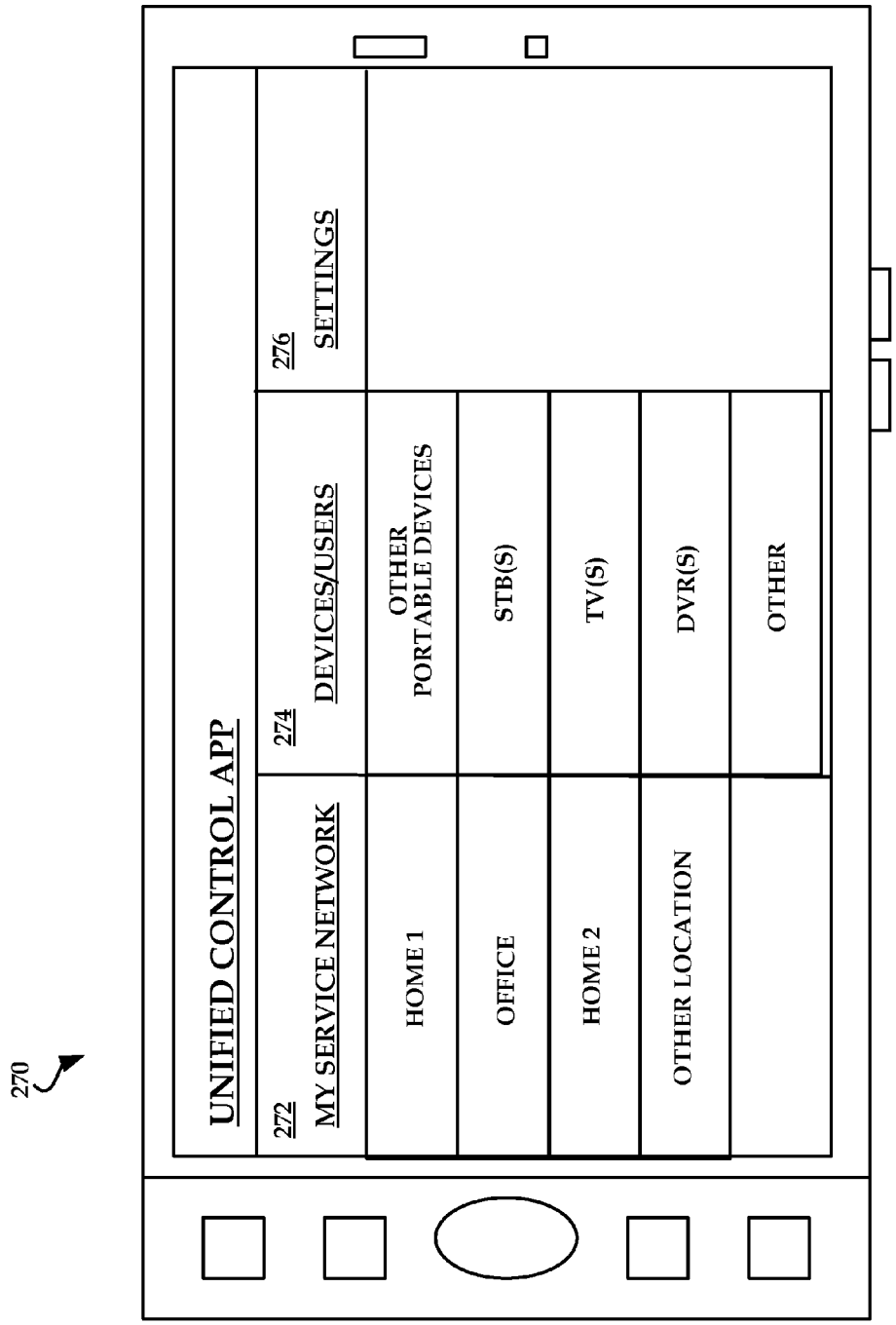

FIG. 2d depicts an exemplary UC interface 270 according to another embodiment. As shown in the enlarged view of FIG. 2d, the UC interface 270 is configured for use with a smart phone or other device having limited display area. Similar to auto-rotate capabilities of tablet computers and other smart phones, the UC interface 270 can rotate according to the device orientation (landscape for this example). For this example, the UC interface 270 includes a section 272 configured to display other users associated with the service network, a section 274 configured to display other devices associated with the service network, and a section 276 configured to display settings associated with the service network.

As shown in the example of FIG. 2d, section 272 of the UC interface 270 is configured to display various networks associated with the current user, including a first home television network, office television network, a second home television network, and another network location. Section 274 is configured to display other devices and/or users associated with the current user or network, such as other portable devices, STBs, smart televisions, and DVRs associated with each network. Section 276 is configured to display settings associated with each network, device, and/or user in a similar manner as described above with respect to FIGS. 2a-2c or according to some other technique.

Figure 3:
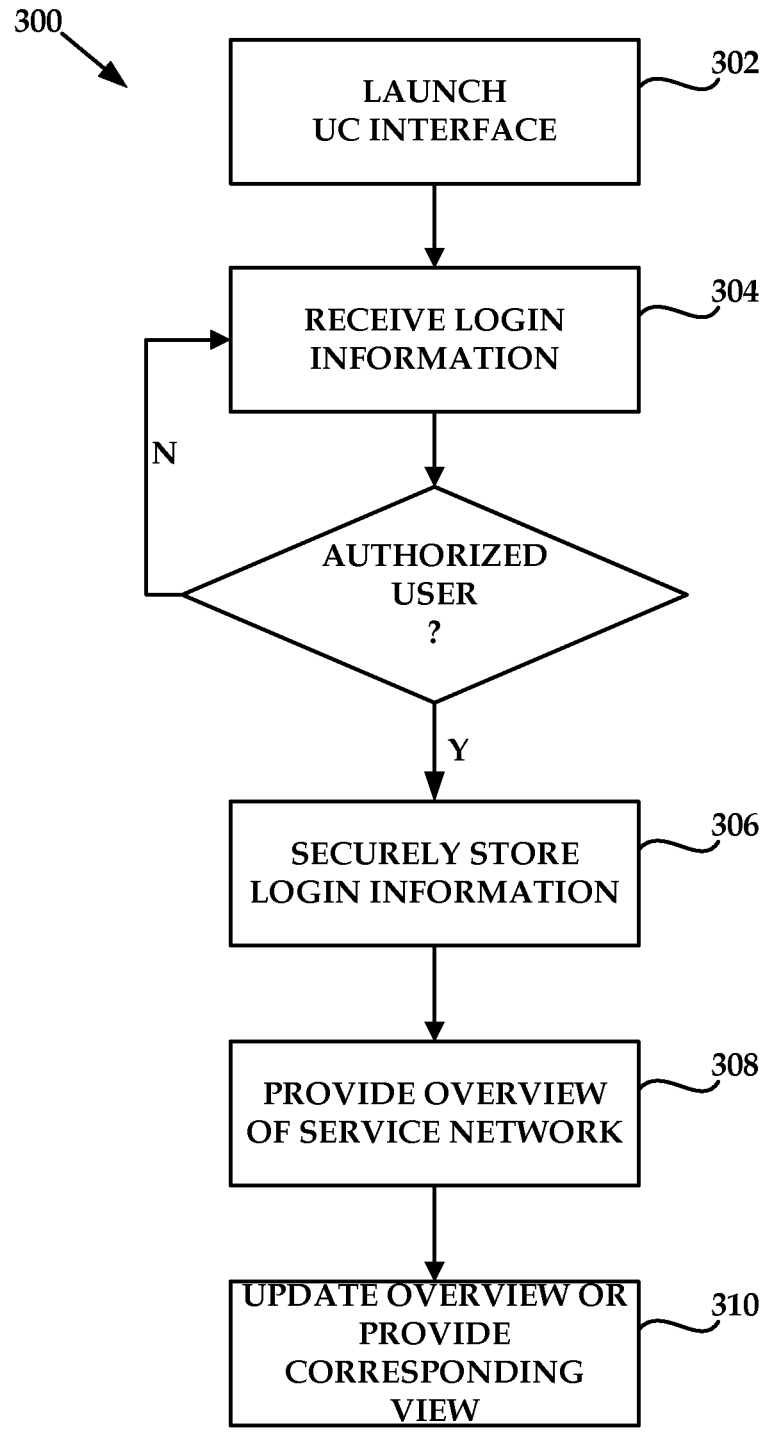
FIG. 3 is a flow diagram illustrating an exemplary process of implementing a unified control and access computing environment according to an embodiment.

FIG. 3 is a flow diagram illustrating an exemplary process 300 of providing a unified control and access computing environment according to an embodiment. The process 300 of an embodiment implements a client-server computer architecture including program or application code as part of providing features of a UC interface running on a portable computing device to control aspects of a service network, such as used by home or business cable or satellite television and Internet consumers for example.

The process 300 enables use of the UC interface running on a portable or mobile computing device to control how users and/or devices interact with the service network, including controlling personalizations of user and/or device settings. For example, a parent can use a tablet computer and features of the UC interface to display an overview of users and/or devices and/or settings associated with the service network as well as controlling and viewing personalization and access controls per user per service per device across the service network, such as personalized guide views, personalized channels to include views, personalized on demand views, personalized recorder views, personalized parental control and access setting views, personalized social network and third party application views, etc.

Taking into account a particular network configuration and/or subscription type, the process 300 can be used to control access and amounts of personalization allowed for each authorized user and/or device. The UC interface of an embodiment can be used in conjunction with a server component to control automatic delivery of user credentials to various components, such as legacy QAM and IP-based components when delivering video and other services.

As described below, depending in part on the identity of the logged in user, the functionality provided by the UC interface can be used in conjunction with the rich interactive features of user portable devices to personalize various aspects of the service network, such as personalizing the user's programming, personalizing other user's services, identifying other devices to automatically login or logout, etc. Certain user may have different types of privileges and/or access levels and the UC interface can use the different types of information in part to control the amount of interaction or personalization allowed for each user and/or device.

With continuing reference to FIG. 3, at 302, the process 300 begins when a user uses a mobile or portable device to launch the UC interface, whether launched from a local installation or via a web-based process. At 304, the process 300 receives login credentials or other authenticating information from using the UC interface and/or the communication capabilities of the portable device as part of an authentication and/or logon procedure. If the user is not an authorized user, the process 300 returns to 302 and the user is prompted or otherwise required to re-enter correct information before being allowed to proceed.

If the user is authorized to access the services, the process 300 at 306 operates to securely store the login credentials if not already stored. For example, the process 300 at 306 can be configured to store the received login credentials securely in local and/or remote storage, as known to those skilled in the art. The securely stored credentials may be accessed and automatically used to prevent users from having to enter the credentials multiple times on other authorized devices after an initial login using one authorized device and an associated UC interface.

At 308, the process 300 uses the UC interface in part to provide an overview of other authorized users, devices, settings, and/or other information associated with the service network. For example, the UC interface can be used to display an overview of the logged in user's personalized programming parameters, status, and/or other information along with similar information associated with other authorized users and/or devices associated with the service network.

In an embodiment, as part of the process 300 at 308, the UC interface can be configured to provide a prompt showing available devices and whether the user would like to auto-matically login or logoff one or more devices or users. As the UC interface receives user input, at 310 the process 300 operates to update the overview or provide a corresponding view according to the user input.

If the user action or input is associated with a different authorized user logging in using the current UC interface or another device running an associated UC interface and if not already authenticated, the process 300 can be configured to authenticate the user before allowing the user to interact with the UC interface. For example, a different authenticated or otherwise authorized user may be using a personal tablet computer to personalize settings, such as a channel lineup and recordings for a first STB located in the living room or other area, as well as personalizing channel views and recordings for a bedroom or game room STB via the associated UC interface. If the credentials of the different user are not currently securely stored, the process 300 stores the different user's credentials and provides the corresponding view or overview.

The automatic login and logout features of the UC interface can also be used to automatically login (or logout) to and display social network and other personalized information on the current device and/or on an associated television or other display coupled to a STB. Moreover, user personalizations and view preferences and/or configurations may encompass relevant programming associated with a particular service and/or login information, such as information associated with analog video, digital video, and other services provided via legacy QAM and IP infrastructure.

Accordingly, the UC interface can be used by a service or network provider as part of a screening mechanism to control automatic forwarding or application of user credentials or other authorizing information across the service network to control use of QAM and CDN resources. While a number and order of operations are described, it will be appreciated that the embodiments encompass other implementations.

Figure 4:
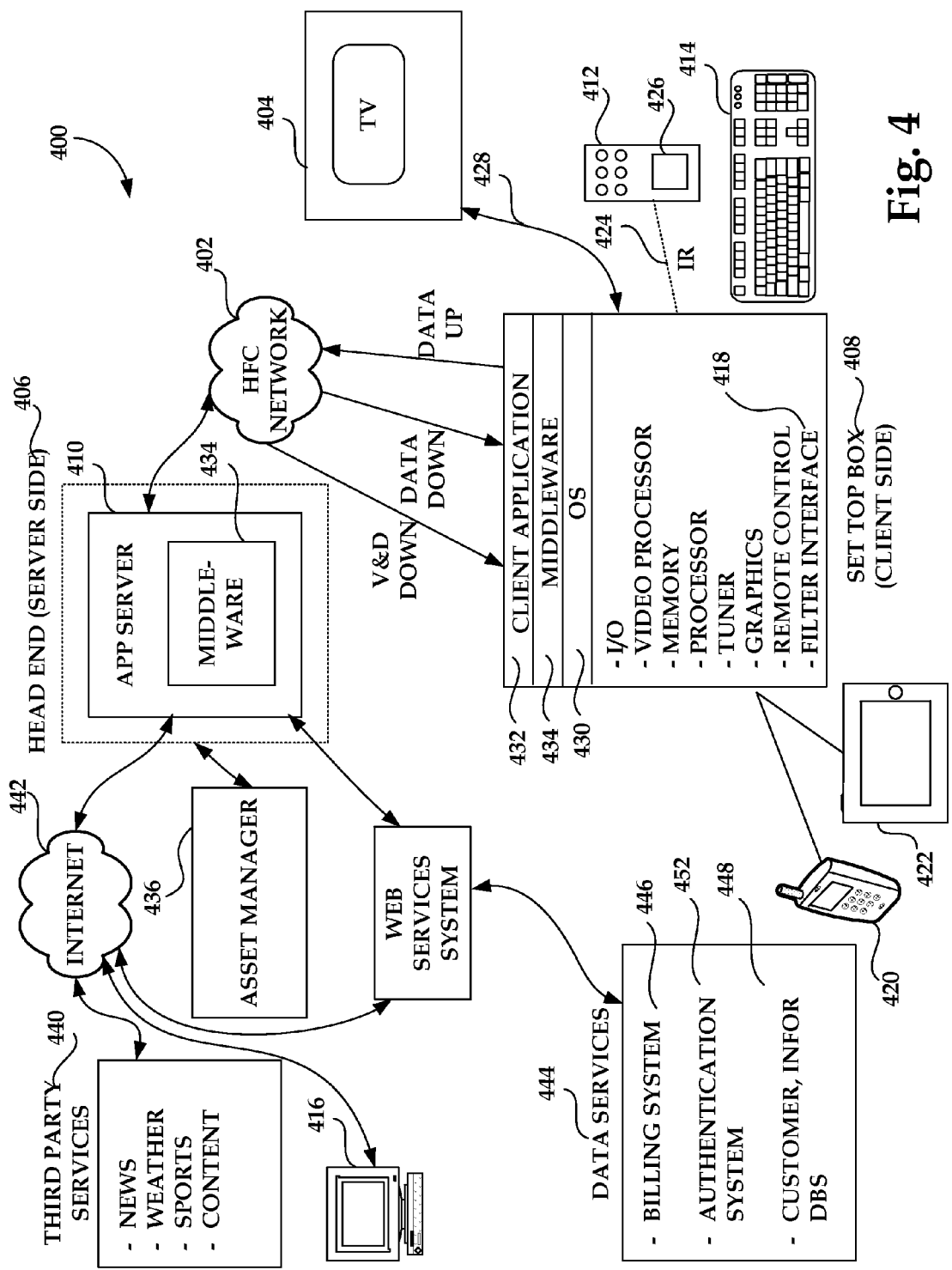
FIG. 4 depicts components of an exemplary communication architecture providing an operating environment according to an embodiment.

FIG. 4 depicts components of an exemplary communication architecture 400 providing an operating environment according to an embodiment. The architecture 400 includes components that provide cable television and other services (hereafter referred to as "CATV") including IP and RF reception capabilities. As described below, components of the architecture 400 can be configured to enable users to use a UC interface to manage automatic access and personalization features available to users of a service network, such as home or business television and Internet service. For example, a primary account holder can use a tablet computer to execute the UC interface to communicate with an application server as part of displaying a detailed overview of the service network, including authorized users and/or devices.

As shown in FIG. 4, digital and analog video programming, information content, and interactive television services are provided via a hybrid fiber coax (HFC) network 402 including optical fiber and coaxial cable components to a television 404, such as a smart television for example. Typically, optical fiber runs from the cable head end 406 to neighborhoods of subscribers. Coaxial cable runs from the optical fiber feeders to each customer or subscriber. The functionality of the HFC network 402 allows for efficient bidirectional data flow between a client-side components, such as STB 408, and application server 410.

The exemplary architecture 400 can be configured as a distributed client-server computing architecture for providing video and data flow across the HFC network 402 from server-side services providers (e.g., cable television/services providers) via head end 406 and STB 408 or other component functionally connected to a customer receiving device, such as a smart television set 404 or other device/system for example. Modern CATV systems provide a variety of services across the HFC network 402 including digital and analog video programming, telephone services, high speed Internet access, video-on-demand, live video streaming, and/or information services as known to those skilled in the art.

On the client side of the architecture 400, digital and analog video programming and digital and analog data are provided to the customer via the STB 408 and/or some other signal processing component. The STB 408 of an embodiment can be configured to be IP-enabled and/or otherwise configured to deliver IP television services to provide live video streaming capability for users to stream video to multiple user devices/systems.

Interactive television services that allow a customer to input data to the architecture 400 likewise are provided by the STB 408. As shown in FIG. 4, the STB 408 of an embodiment is configured as a multipurpose computing device having at least one computer processor, memory, and/or input/output mechanism(s) and functionalities. An input/output mechanism receives input from server-side processes via the HFC network 402 and from customers via input devices such as the remote control device 412, keyboard 414, or other computing device/system 416, such as a tablet/slate computer, smart phone, etc.

The STB 408 of an embodiment can also include IP communication capability and provide a filter interface 418 for presenting filtered programming and/or content via STB 408 to the television 404. While the filter interface 418 may be implemented using a STB, the filter interface 418 may also be provided using a wireless device 420, any type of network media device, or any device capable of interfacing with a STB 408 or in a server or other module on the head end side. Compatible devices may include DVRs, wireless phones, PCs, laptop computers, tablet/slate computers, media viewing devices, and the like.

The remote control device 422 and the keyboard 414 may communicate with the STB 408 via a suitable communication transport such as an infrared connection 424. The remote control device 422 may include a biometric input module 426. The STB 408 also includes a video processor for processing and providing digital and analog video signaling to the television set 404 via a cable communication transport 428. A multi-channel tuner is provided for processing video and data to and from the STB 408 and the server-side head end system 406. The STB 408 as well as other components can include or couple to each UC interface.

The STB 408 also includes an operating system 430 for directing the functions of the STB 408 in conjunction with a variety of client applications 432. Because a variety of different operating systems 430 may be utilized by a variety of different brands and types of set-top boxes, a middleware layer 434 may be provided to allow a given software application to be executed by a variety of different operating systems. According to an embodiment, the middleware layer 434 may include a set of application programming interfaces (APIs) that are exposed to client applications 432 and operating systems 430 that allow the client applications to communicate with the operating systems through common data calls understood via the API set.

A corresponding middleware layer can be included on the server side of the architecture 400 for facilitating communication between the application server and the STB 408. The middleware layer 434 of the application server and middleware layer of the STB 408 may format data passed between the client side and server side according to a markup language such as Extensible Markup Language (XML) for example.

According to one embodiment, the STB 408 passes digital and analog video and data signaling to the television 404 via a one-way communication transport. According to other embodiments, two-way communication transports may be utilized, for example, via high definition multimedia (HDMI) ports. The STB 408 may receive video and data from the server side of the architecture 400 via the HFC network 402 such as through a video/data downlink (shown as "V&D down") and/or data via a data downlink.

The STB 408 may transmit data from the client side to the server side via the HFC network 402 via one data uplink. The video/data downlink is an in band downlink that allows for digital and analog video and data signaling from the server side of the architecture 400 using the HFC network 402 to the STB 408 for use by the STB 408 and for distribution to the television set 404. An in band signaling space operates at a relative high frequency, e.g., from about 54 to about 1000 megahertz and an exemplary signaling space is generally divided into 6 megahertz channels in which may be transmitted as a single analog signal or a greater number of digital signals.

The data downlink and the data uplink between the HFC network 402 and the STB 408 may comprise out of band data links. An out of band frequency range is generally at as a lower frequency than in band signaling. For example, the out of band frequency range may be about zero to about 54 megahertz. Data flow between the STB 408 and the application server 410 can be passed through out of band data links. Alternatively, an in band data carousel may be positioned in an in band channel into which a data feed may be processed from the application server 410 through the HFC network 402 to the STB 408. Operation of data transport between components of the architecture 400 is well known to those skilled in the art.

With continuing reference to FIG. 4, the head end 406 is positioned on the server side and includes hardware and software systems responsible for originating and managing content for distributing through the HFC network 402 to the client-side for presentation to customers via television 404 or some other client device/system. As described above, a number of services may be provided by the architecture 400, including digital and analog video programming, interactive television services, telephone services, video-on-demand services, targeted advertising, and provision of information content. An asset manager 436 maintains content at the head end 406. The asset manager 436 may also include a decision server for processing rules and other input to determine what content to provide.

The application server 410 can be configured as a computing system operative to assemble and manage data sent to and received from the STB 408 via the HFC network 402. As described above with reference to the STB 408, the application server 410 includes a middleware layer 434 for processing and preparing data from the head end for receipt and use by the STB 408. For example, the application server 410 via the middleware layer 434 may obtain data from third-party services 440 via the Internet 442 for example and transmit to a customer through the HFC network 402 and the STB 408. For example, a weather report from a third-party weather service may be downloaded by the application server via the Internet 442. When the application server 410 receives the downloaded weather report, the middleware layer 434 may be utilized to format the weather report for receipt and use by the STB 408.

According to one embodiment, data obtained and managed by the middleware layer 434 of the application server 410 is formatted using XML and passed to the STB 408 where the XML-formatted data may be utilized by a client application 432 in concert with the middleware layer 434. As should be appreciated by those skilled in the art, a variety of third-party services data, including news data, weather data, sports data and other information content may be obtained by the application server 410 via distributed computing environments such as the Internet 442 for provision to customers via the HFC network 402 and the STB 408.

According to various embodiments, the application server 410 obtains customer support services data, including billing data, information on customer work order status, answers to frequently asked questions, services provider contact information, and the like from data services 444 for provision to the customer via an interactive television or other session. The services provider data services 444 include a number of services operated by the services provider of the architecture 400 which may include data on a given customer.

A billing system 446 may include information such as a customer's name, street address, business identification number, Social Security number, credit history, and information regarding services and products subscribed to by the customer. According to embodiments, the billing system 446 may also include billing data for services and products subscribed to by the customer for bill processing, billing presentment and payment receipt.

A customer information database 448 may include general information about customers such as place of employment, business address, business telephone number, and demographic information such as age, gender, educational level, and the like. The customer information database 448 may also include information on pending work orders for services or products ordered by the customer. The customer information database 448 may also include general customer information such as answers to frequently asked customer questions and contact information for various service provider offices/departments. As should be understood, information may be stored in a variety of disparate databases operated by the cable services provider.

As shown in the example of FIG. 4, a web services system 450 is illustrated between the application server 410 and the data services 444. According to embodiments, web services system 450 serves as a collection point for data requested from each of the disparate data services systems comprising the data services 444. According to various embodiments, when the application server 410 requires customer services data from one or more of the data services 444, the application server 410 passes a data query to the web services system 450. The web services system 450 formulates a data query to each of the available data services systems for obtaining any required data for a requesting customer as identified by a set-top box or other identification associated with a customer.

The web services system 450 serves as an abstraction layer between the various data services systems and the application server 410. That is, the application server 410 of an embodiment is not required to communicate with the disparate data services systems, nor is the application server 410 required to understand the data structures or data types utilized by the disparate data services systems.

The web services system 450 is operative to communicate with each of the disparate data services systems for obtaining necessary customer data. The customer data obtained by the web services system is assembled and is returned to the application server 410 for ultimate processing via the middleware layer 434, as described above. An authentication system 452 may include securely stored information according to known encryption and storage techniques, such as secure user names, subscriber profiles, subscriber IDs, passwords, and/or other information for accessing network services. As will be understood by those skilled in the art, the disparate systems may be integrated or provided in any combination of separate systems, wherein FIG. 4 only serves as one example.

Figure 5:
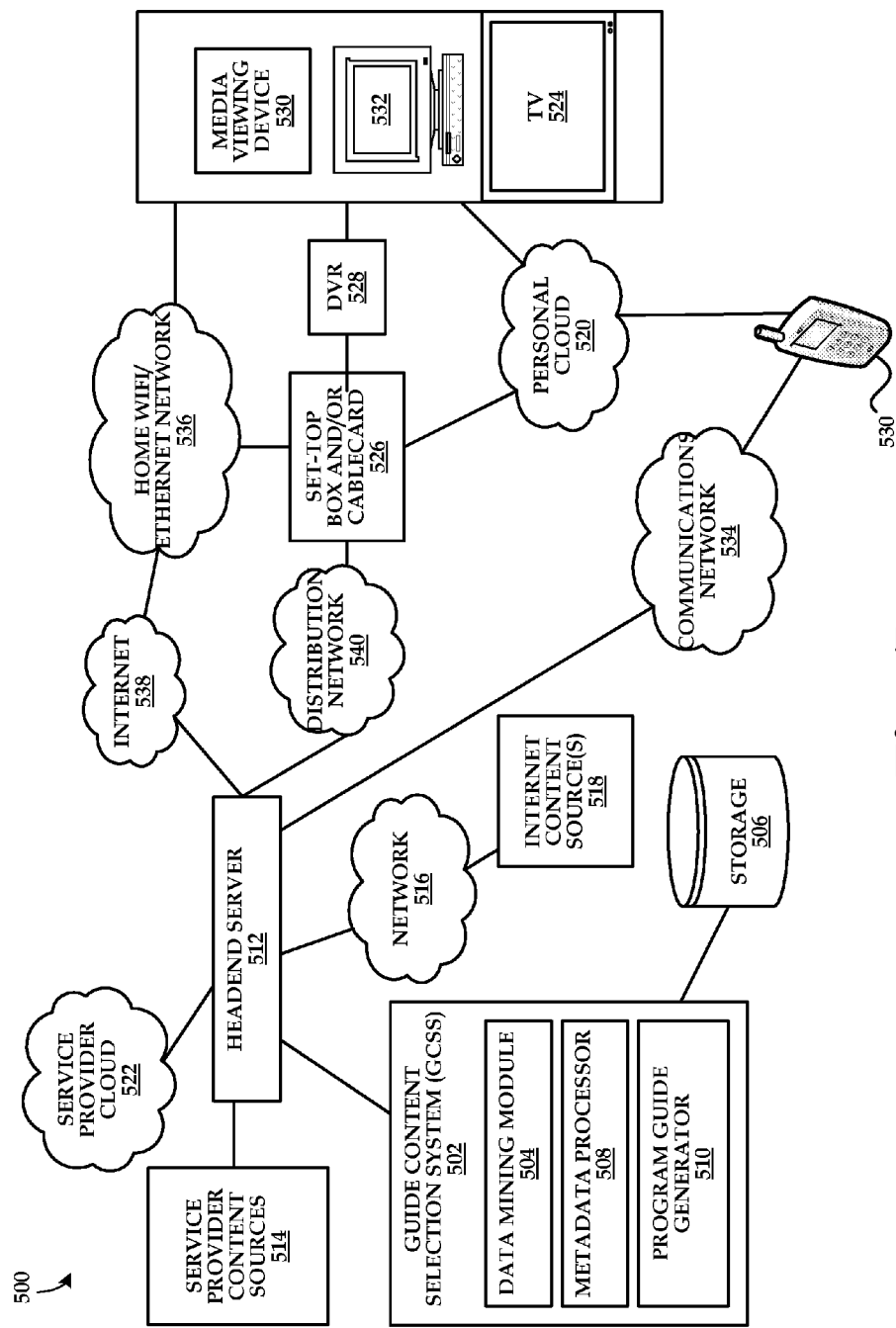
FIG. 5 depicts components of an exemplary communication architecture providing an operating environment according to an embodiment.

FIG. 5 depicts components of an exemplary communication architecture 500 providing an operating environment according to an embodiment. Components of the architecture 500 are configured in part to provide information associated with content from a plurality of sources, according to an embodiment. A guide content selection system (GCSS) 502 is illustrative of one or more computing components to which metadata and other information for linear and non-linear programs may be provided for analyzing, categorizing, processing, storing, and/or linking with other available data for providing subscriber services.

According to embodiments, each of the components of the GCSS 502 illustrated in FIG. 5 may operate as standalone components that are operatively coupled with a data hub for providing and receiving data in association with programming content and availability, business rules, profiles, devices, etc. Accordingly, a data mining module 504, storage 506, metadata processor 508, and a program guide generator 510 may be independent operating entities located at disparate locations and that are operative for generating program guide data and/or operate as a collection or distribution of components at one or more locations in communication via a distributed computing network, such as the Internet or an intranet. In certain embodiments, features of the data mining module 504, storage 506, metadata processor 508, and/or the program guide generator 510 may be integrated or operate in a variety of combinations of components.

As shown in FIG. 5, the headend server 512 may provide different metadata for non-linear programs/content. The GCSS 502 may receive metadata for non-linear programs/content from the headend server 512 as well as metadata from other service provider content sources 514, such as Video On Demand (VOD) and video content available through a network 516 from Internet content sources 518.

Additionally, the GCSS 502 may receive customer's purchased content, content available from the customer's cloud 520, and/or content from the service provider's cloud 522. Content metadata may be categorized based on availability and sent to customer devices/systems for maintaining or using the program guide data. The customer devices/systems may include a smart television 524, STB and/or cablecard 526, a DVR 528, a smart phone 530, and/or user media devices 530 and 532. Smart phone 530 may receive data via a communications network 534 or by access the customer's personal cloud 520, as known in the art.

The data mining module 504 can be configured to access content sources and retrieve data associated with content for viewing. The data mining module 504 can analyze the data from different perspectives or sources and/or summarize mined data into useful information. The data mining module 504 may categorize the content, for example, based on the day/time/customer preferences, to display the user programming information. The metadata processor 508 can be configured to process linear video program guide data, store past program guide data, process other available data, determine a duration for maintaining the data and/or link other available data for use by the program guide generator 510 to provide display views on user devices/systems.

The customer site can include a home WiFi/Ethernet network 536 that provide access to the Internet 538, a set-top box and/or cablecard 526, DVR 528, and other user devices/systems. The home WiFi/Ethernet network 536 may receive data and transfer the data to the appropriate endpoint such as the smart television 524, set-top box and/or cablecard 526, DVR 528, and/or other user devices/systems. Likewise, the home WiFi/Ethernet network 536 may receive data from any device/system on the customer site and transmit the data to other components. The set-top box and/or cablecard 526 can receive content using the headend server 512 via the distribution network 540 and provide the content to the user devices/systems for display.

The user may set parameters or otherwise configure a UC interface to display content available for viewing according to a variety of factors such as genre, selected titles, actors, directors or other criteria. The UC interface can be configured to display on any type of display or screen that a user chooses to view content. For example, the UC interface may be configured to display service network overviews and personalized programming views for viewing on a smart phone, smart television, tablet, or other viewing device/system. Digital rights management may dictate that certain content is available for viewing only on a particular device.

As discussed above, the exemplary architecture 500 includes infrastructure for delivering and receiving content using server-side components and consumer-side or client-side components. The architecture 500 can be configured to deliver high-speed broadband data signals and services to end-users. The architecture 500 includes an IP backbone comprising a packet-switched network, such used for the Internet, wireless communication, ADSL and CATV. The IP backbone can be used to distribute a rich array of digital content, including video streaming, to a variety of client applications.

The architecture 500 enables broad access to content of a content delivery network (CDN) including content accessible by users via the Internet or some other network. IP-enabled set-top boxes can be controlled by a middleware platform to provide linear IP video MPEG by encapsulating packets for transmitting and receiving. Video signals can be delivered using a cable modem termination system (CMTS), QAM components, and/or some other component or protocol. CDNs typically function by receiving requests from clients, checking a local cache for a copy of the requested resource, or querying some source if a requested resource is not in the cache or has expired for example. CDN servers can be strategically located at the edges of various networks to limit loads on network interconnects and backbones. CDN servers can be redundantly deployed and interact with other CDN servers to respond to content requests from clients in attempts to optimize content delivery. For example, network edge servers can enable ease of browsing, navigating and streaming of content, including streaming live video.

Components can be operatively coupled with a data hub for providing and receiving data in association with programming content and availability, business rules, profiles, devices/systems, etc. Collecting content can include non-linear programs/content, other service provider content (Video On Demand (VOD)), content available through a network that includes a plurality of Internet content sources, etc. Content may be associated with a customer's purchased content, a personal or customer cloud, content from other service provider clouds, and/or from a QAM tuner. Content metadata may be categorized based on the availability and sent to customer devices/systems for maintaining or using the program guide data. Depending on the particular customer set-up, a customer may employ different networked components, including a WiFi/Ethernet network to receive video over IP, including but not limited to, a modem, set-top box/cablecard, game console, DVR, smart phone, desktop, laptop, etc.

A typical implementation example may include a subscriber using a tablet, slate phone, smart television and the like to view video programming using a high speed Internet service, a video streaming application, and a DOCSIS modem, eMTA, or gateway. A WiFi/Ethernet network can receive data and transfer data to an appropriate consumer device/system via an IP-enabled STB, and also receive/transmit data from any device/system to other components of the architecture 500. It will be appreciated that there are different types of communication networks and associated components that can be used to deliver video and other content to consumer devices, including smart televisions, tablet computers, laptop computers, desktop computers, etc.

The embodiments and functionalities described herein may operate via a multitude of computer implementations, including wired and wireless computing systems, mobile computing systems (e.g., mobile telephones, tablet or slate type computers, laptop computers, etc.). In addition, the embodiments and functionalities described herein may operate over distributed systems, where application functionality, computer storage or computer readable storage including memory, data storage and retrieval and various processing functions may be operated remotely from each other over a distributed computing network, such as the Internet or an intranet. The example devices and systems discussed herein are for purposes of example and illustration and are not limiting of a vast number of configurations that may be utilized for practicing various embodiments.

Figure 6:
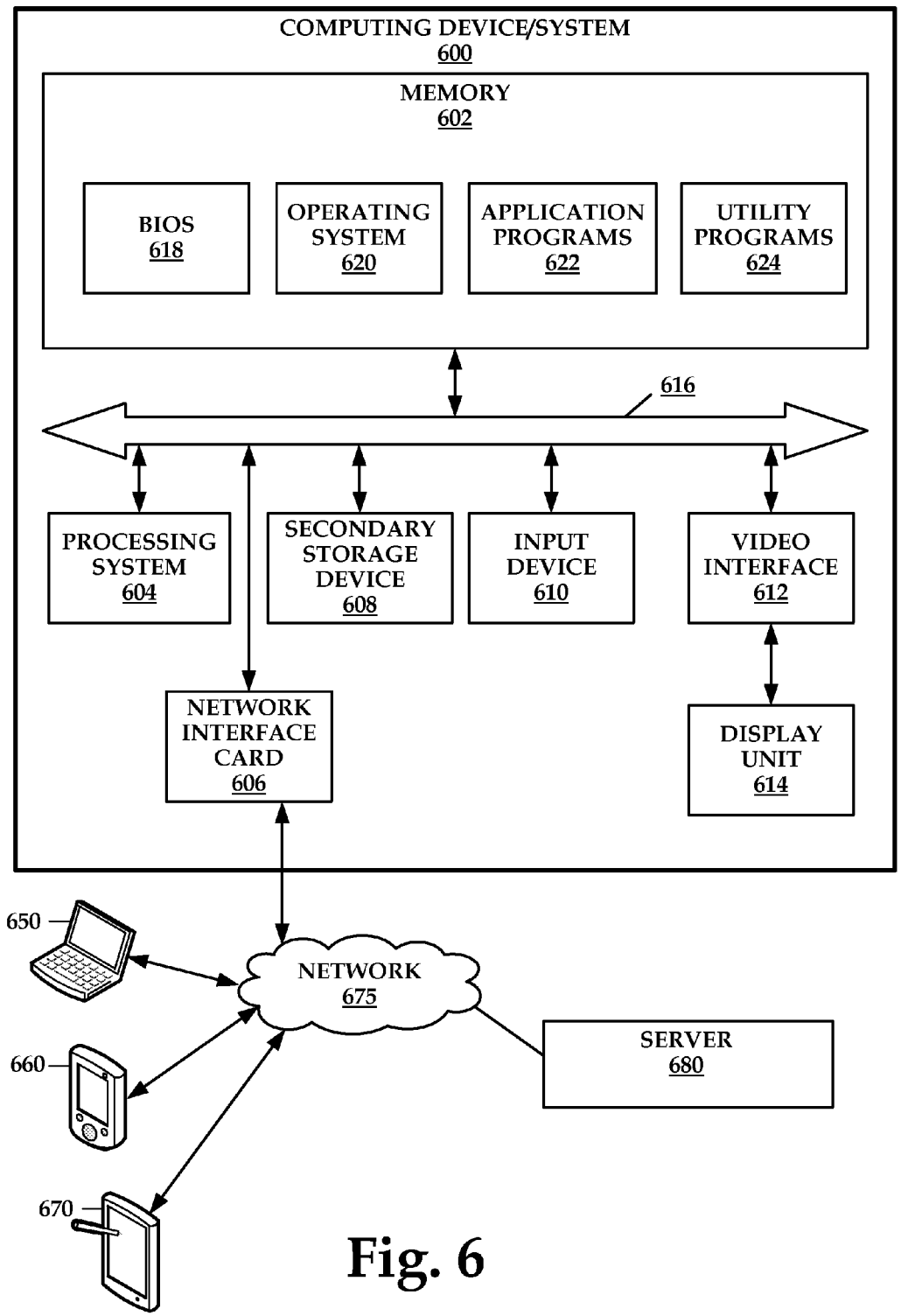
FIG. 6 is a block diagram illustrating exemplary components which embodiments may be practiced.

FIG. 6 is a block diagram illustrating exemplary components with which embodiments may be practiced. It should be appreciated that other embodiments may be implemented using computing devices having hardware and/or software components other than those illustrated in the example of FIG. 6. Computing devices/systems may be implemented in different ways in different embodiments.

For the example of FIG. 6, the computing device 600 includes a processing system 604, computer storage or memory 602, a network interface 606, a secondary storage device 608, an input device 610, a video interface 612, a display unit 614, and a communication medium 616. In other embodiments, the computing device 600 may be implemented using more or fewer hardware components (e.g., a video interface, a display unit, input device(s), etc.) or in combination with other types of computer systems and program modules.

The memory 602 includes one or more computer-readable storage, computer storage, or computer-readable storage media capable of storing data and/or computer-executable or encoded instructions. Memory 602 thus may store the computer-executable instructions that, when executed by processor 604, cause the application server 104 to allow broad access to content placed on a content delivery network (CDN).

In various embodiments, the memory 602 is implemented in various ways. For example, the memory 602 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 604 includes one or more processing units, which may include tangible integrated circuits that selectively execute computer-executable instructions. In various embodiments, the processing units in the processing system 604 are implemented in various ways. For example, the processing units in the processing system 604 can be implemented as one or more processing cores. In this example, the processing system 604 can comprise one or more core microprocessors. In another example, the processing system 604 can comprise one or more separate microprocessors. In yet another example embodiment, the processing system 604 can comprise Application-Specific Integrated Circuits (ASICs) that provide specific functionality. In yet another example, the processing system 604 provides specific functionality by using an ASIC and by executing computer-executable instructions.

The computing device 600 may be enabled to send data to and receive data from a communication network via a network interface 606. In different embodiments, the network interface 606 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 608 includes one or more computer-readable storage media, and may store data and computer-executable instructions not directly accessible by the processing system 604. That is, the processing system 604 performs an I/O operation to retrieve data and/or computer-executable instructions from the secondary storage device 608. In various embodiments, the secondary storage device 608 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 610 enables the computing device 600 to receive input from a user. Example types of input devices include, but are not limited to, keyboards, mice, trackballs, stylus input devices, key pads, microphones, joysticks, touch-sensitive display screens, and other types of devices that provide user input to the computing device 600. The video interface 612 outputs video information to the display unit 614. In different embodiments, the video interface 612 is implemented in different ways. For example, the video interface 612 is a video expansion card. In another example, the video interface 612 is integrated into a motherboard of the computing device 600.

In various embodiments, the display unit 614 can be a an LCD display panel, a touch-sensitive display panel, an LED screen, a projector, a cathode-ray tube display, or another type of display unit. In various embodiments, the video interface 612 communicates with the display unit 614 in various ways. For example, the video interface 612 can communicate with the display unit 614 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 616 facilitates communication among the hardware components of the computing device 600. In different embodiments, the communications medium 616 facilitates communication among different components of the computing device 600. For instance, in the example of FIG. 6, the communications medium 616 facilitates communication among the memory 602, the processing system 604, the network interface 606, the secondary storage device 608, the input device 610, and the video interface 612. In different embodiments, the communications medium 616 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618, and an operating system 620. The BIOS 618 includes a set of software instructions that, when executed by the processing system 604, cause the computing device 600 to boot up. The operating system 620 includes a set of software instructions that, when executed by the processing system 604, cause the computing device 600 to provide an operating system that coordinates the activities and sharing of resources of the computing device 600. The memory 602 also stores one or more application programs 622 that, when executed by the processing system 604, cause the computing device 600 to provide applications to users. The memory 602 also stores one or more utility programs 624 that, when executed by the processing system 604, cause the computing device 600 to provide utilities to other software programs.

Embodiments of the present invention may be utilized in various distributed computing environments where tasks are performed by remote processing devices that are linked through a communications network in a distributed computing environment. Moreover, embodiments may be implemented such that each or many of the components illustrated in FIG. 6 may be integrated onto a single integrated circuit. When operating via such a single integrated circuit, the functionality, described herein, may be operated via application-specific logic integrated with other components of the computing device/system 600 on the single integrated circuit.

A server 680 may provide other services to client devices/systems. As one example, server 680 may be a web server providing web services over the web network 675. Example clients include computing device 650, which may include any general purpose personal computer (such as computing device 600), a tablet computing device 670 and/or mobile computing device 660, such as smart phones.

FIGS. 7*a*-7*b* illustrate an exemplary mobile computing environment comprising a mobile computing device 700 such as a smart phone, a tablet or slate computer, a laptop computer, and the like, with which embodiments may be practiced. The mobile computing device 700 is illustrative of any suitable device operative to send, receive and process wireless communications according to embodiments of the present invention. A display screen 705 is operative for displaying a variety of information such as information about incoming and outgoing communications, as well as, a variety of data and displayable objects, for example, text, alphanumeric data, photographs, and the like.

Data input to the device 700 may be performed via a variety of suitable means, such as, touch screen input via the display screen 705, keyboard or keypad input via a data entry area 710, key input via one or more selectable buttons or controls 715, voice input via a microphone 718 disposed on the device 700, photographic input via a camera 725 functionality associated with the mobile computing device, or any other suitable input means. Data may be output via the device 700 via any suitable output means, including but not limited to, display on the display screen 705, audible output via an associated speaker 730 or connected earphone system, vibration module for providing tactile output, and the like.

Referring now to FIG. 7b, operational unit 735 is illustrative of internal operating functionality of the mobile computing device 700. A processor 740 is illustrative of a general purpose computer processor for processing incoming and outgoing data and communications and controlling operation of the device and associated software applications via a mobile computing device operating system. Memory 745 may be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 700 may contain an accelerometer 755 for detecting acceleration, and can be used to sense orientation, vibration, and/or shock. Mobile computing device 700 may contain a global positioning system (GPS) system (e.g., GPS send/receive functionality) 760. A GPS system 760 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 750 include all required functionality, including onboard antennae, for allowing the device 700 to communicate with other communication devices and systems via a wireless network. Radio functions 750 may be utilized to communicate with a wireless or WIFI-based positioning system to determine a device location.

Although described herein in combination with mobile computing device 700, in alternative embodiments the invention may be used in combination with any number of computer systems, such as in desktop environments, laptop or notebook computer systems, multiprocessor systems, microprocessor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein. For example, two processes shown or described in succession may in fact be executed substantially concurrently or the blocks may sometimes be executed in the reverse order, depending upon the functionality/acts involved.

Although embodiments have been described as being associated with data stored in memory and other storage mediums, data may also be stored on or read from other types of computer storage or computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method executing with a portable computing device comprising:
submitting login credentials with a unified control (UC) interface associated with a subscribed to service network to access television programming and network services;
identifying other portable computing devices with the UC interface to manage and allow access to features of the subscribed to service network, including identifying multiple portable computing devices to automatically login and automatically logout with respect to the television programming and network services, and control access to greater or fewer numbers of the features of the subscribed to service network based in part on the login credentials, wherein the UC interface is configured to: display information associated with other users and devices of each of the other users associated with the television programming and network services, and display selectable automatic login and automatic logout options for each of the multiple portable computing devices that enables use of the UC interface to select one or more of the multiple portable computing devices at the same time to automatically login and automatically logout such that the login credentials are not required to be entered each time in order for the multiple portable computing devices to access the television programming and network services; and
displaying an overview with the UC interface of authorized users and authorized portable computing devices associated with the subscribed to service network, the UC interface configured to display personalization information associated with one or more television components, set-top box (STB) components, or other program viewing components.

2. The method of claim 1, further comprising identifying with the UC interface each authorized portable computing device before allowing access to the services and enabling automatic login for each authorized portable computing device, wherein the UC interface is configured to display a prompt to enable identification of each authorized portable computing device.

3. The method of claim 1, further comprising controlling delivery of the login credentials via an application server in order to receive analog video and digital video programming.

4. The method of claim 3, further comprising securely storing the login credentials via the application server for use in automatically logging in one or more other computing devices.

5. The method of claim 3, further comprising securely storing the login credentials via the application server for use in automatically logging out one or more other computing devices.

6. The method of claim 3, further comprising providing via the application server a STB setting overview according to the subscription and user settings.

7. The method of claim 3, further comprising providing via the application server a substantially similar STB view as shown on a television display connected to the STB including displaying analog and digital video programming per user per device.

8. The method of claim 3, further comprising providing via the application server a substantially similar view that would be shown on a television display coupled to a second STB including displaying advanced digital IP, On Demand, and/or QAM in the clear services.

9. The method of claim 1, further comprising displaying with the UC interface corresponding user overviews for different favorite and HD channels, different guide views, different recommendations, different recordings, and different video on demand (VOD) options.

10. The method of claim 1, further comprising sending different login credentials automatically for different authorized users absent requiring credential re-entry to receive legacy QAM and IP-based content and services.

11. The method of claim 1, further comprising storing the login credentials securely using computer storage.

12. A portable computing device comprising:
processing and memory resources; and
a UC interface configured to use the processing and memory resources as part of displaying an overview of a television and IP service network including information associated with other authorized users and portable computing devices, wherein the UC interface is configured to automatically login and automatically logout multiple portable computing devices with respect to the television and IP service network and provide the overview to include personalization information associated with one or more smart televisions, STBs, or other components according to login credentials of each authorized user, wherein the UC interface is further configured to: display information associated with other users and devices of each of the other users associated with the television and IP service network, and display selectable automatic login and automatic logout options for each of the multiple portable computing devices that enables selecting one or more of the multiple portable computing devices at the same time to automatically login and automatically logout such that the login credentials are not required to be entered each time in order for the multiple portable computing devices to access the television and IP service network.

13. The portable computing device of claim 12, wherein the UC interface is configured to display a first interface section to display the authorized users including user login status, a second interface section to display the authorized devices including device status, and a third section to display associated settings.

14. The portable computing device of claim 13, wherein the UC interface is configured to display personalized settings associated with an authorized user in the third section upon selecting the authorized user in the first interface section.

15. The portable computing device of claim 13, wherein the UC interface is configured to display personalized settings associated with an authorized device upon clicking or tapping on the authorized device in the second interface section.

16. The portable computing device of claim 12, wherein the UC interface is configured to display a similar view that a user would see while using a designated STB and using the interactive features to personalize aspects of the designated STB.

17. The portable computing device of claim 12, wherein the UC interface is configured to provide a one-time login enabling customers to automatically login multiple authorized devices without having to enter or re-enter previously entered correct login credentials for each authorized device or each authorized user.

18. Computer storage, excluding a signal, including instructions that operate to:
receive login credentials from a UC interface associated with a subscribed to service network that includes television programming and network services;
enable other identified users and devices to automatically logout multiple portable computing devices from the television programming and network services and login the multiple portable computing devices to access defined services of the subscribed to service network based in part on the login credentials, wherein the instructions operate further to receive a selection at the same time associated with a display of selectable automatic login and automatic logout options for each of the multiple portable computing devices to automatically login and automatically logout such that the login credentials are not required to be entered each time in order for the multiple portable computing devices to access the television programming and network services; and
provide information for displaying an overview of authorized users and authorized devices to access the defined services of the subscribed to service network, the information including personalization information associated with the other identified users and devices and configuration of one or more television components, STB components, and other devices.

19. The computer storage of claim 18, wherein the instructions are further configured to automatically login other authorized users without requiring the other authorized users to submit login information.

20. The computer storage of claim 18, wherein the instructions are further configured to manage submitting the login credentials to components used to provide the services, including automatically communicating social networking or other third party access credentials.

* * * * *